(12) United States Patent
Adams

(10) Patent No.: US 7,171,546 B2
(45) Date of Patent: Jan. 30, 2007

(54) CPU LIFE-EXTENSION APPARATUS AND METHOD

(76) Inventor: Phillip M. Adams, 313 Pleasant Summit Dr., Henderson, NV (US) 89012

( * ) Notice: Subject to any disclaimer, the term of this patent is extended or adjusted under 35 U.S.C. 154(b) by 531 days.

(21) Appl. No.: 10/155,284

(22) Filed: May 23, 2002

(65) Prior Publication Data

US 2003/0221035 A1    Nov. 27, 2003

(51) Int. Cl.
*G06F 9/00* (2006.01)
(52) U.S. Cl. ..................................... 712/227
(58) Field of Classification Search ............... 712/200, 712/209, 227; 703/26
See application file for complete search history.

(56) References Cited

U.S. PATENT DOCUMENTS

| | | | | |
|---|---|---|---|---|
| 4,763,242 A | * | 8/1988 | Lee et al. ...................... 703/27 |
| 5,367,658 A | * | 11/1994 | Spear et al. .................. 711/163 |
| 5,574,873 A | | 11/1996 | Davidian ..................... 395/376 |
| 5,574,927 A | * | 11/1996 | Scantlin ....................... 712/41 |
| 5,675,825 A | | 10/1997 | Dreyer et al. ................ 395/800 |
| 5,732,235 A | | 3/1998 | Kahle et al. ................. 395/385 |
| 5,781,750 A | | 7/1998 | Blomgren et al. ........... 395/385 |
| 5,870,575 A | | 2/1999 | Kahle et al. ................. 395/385 |
| 5,898,885 A | | 4/1999 | Dickol et al. ............. 395/800.36 |
| 5,995,743 A | | 11/1999 | Kahle et al. .............. 395/500.42 |
| 6,163,764 A | | 12/2000 | Dulong et al. ................ 703/26 |
| 6,202,174 B1 | | 3/2001 | Lee et al. ...................... 714/38 |
| 6,205,540 B1 | | 3/2001 | Grieb et al. ................. 712/209 |

OTHER PUBLICATIONS

Turley, "Advanced 80386 Programming Techniques," Osborne McGraw-Hill, 1988, pp. 246-247.*

* cited by examiner

*Primary Examiner*—Eddie Chan
*Assistant Examiner*—David J. Huisman
(74) *Attorney, Agent, or Firm*—Pate Pierce & Baird

(57) ABSTRACT

A CPU life-extension apparatus and method makes a processor appear to be an upgraded CPU to substantially all software applications accessed thereby, thereby reducing the need and expense of upgrading a selected processor. A CPU life-extension module translates new instructions, intended for a CPU upgrade, into instructions recognized by the processor. In addition, the CPU life-extension module is programmed to monitor reads from and writes to a processor's flags register to modify the flags to emulate those of an upgraded CPU. The CPU life-extension module is configured to respond to interrupts generated by the processor in order to perform its various tasks.

38 Claims, 11 Drawing Sheets

| Memory | 14 |
|---|---|
| Operating System | 82 |
| Interrupt Handlers | 90 |

| Interrupt Vector Table | 92 |
|---|---|

| Drivers | 94 |
|---|---|
| CPU Life-Extension Module | 80 |
| Invalid Opcode Handler Module | 96 |
| Stack Fault Handler Module | 98 |
| Breakpoint Handler Module | 100 |
| Other Handler Modules | 102 |

| Applications | 84 |
|---|---|

FIG. 4

CPU LIFE-EXTENSION APPARATUS AND METHOD

BACKGROUND

1. The Field of the Invention

This invention relates to computer systems and, more particularly, to novel systems and methods for extending the instruction set of existing CPUs via software "welding" techniques.

2. The Background Art

A CPU, also known as a processor, is the processing center of a computer system. A CPU may be designed with a collection of machine language instructions, or instruction set, that the processor understands and follows. Program code, developed to perform a desired task, must ultimately perform its various functions and routines using the instruction set of the processor on which it is processed. As CPU manufacturers, such as Intel, have released newer and faster processor architectures, one hallmark of their evolution and design has been backward compatibility, meaning that newer chips will execute the instruction set of previous processors. However, program code written for newer architectures may not run on the older processors, since new instructions may be utilized. In some cases, the instruction set of a new CPU architecture may only include a few new instructions as compared to those of its predecessor.

For example, the Intel 80486 (the 486) processor architecture added 6 new instructions to extend its Intel 80386 (the 386) instruction set core. Likewise, the Intel Pentium added 8 new instructions to its 486 instruction set core. In some cases, software may utilize the new instructions, and therefore, not run on older processors. These new instructions, if encountered by an older processor, may incur errors in the operation thereof, and may cause a system shutdown or the like.

As new instructions are added, some software may check the characteristics, such as clock speed, architecture, and the like, of the processor on which it is running. Certain instructions, when executed, simply identify selected characteristics of the processor. These characteristics may be used like flags by the software to decide whether to proceed with execution or to modify execution in some way. For example, the CPUID instruction, introduced to the core instruction set in upgraded processors, may return the values of certain characteristics of a given processor. Some processors may not support this instruction and will, therefore, incur errors when encountering it.

Installation programs, used to install many software applications, may check the characteristics of a processor and require that a computer meet a pre-selected set of requirements. For example, a purchased software package may state on its packaging a minimum CPU architecture, clock speed, RAM requirements, secondary storage (disk capacity) requirements, or a combination thereof to operate the software. If these minimum system requirements are not met, the installation program may abort the installation process and prevent a user from installing the desired software.

Some software manufacturers may justify this action in order to ensure that a software package performs at what the manufacturer considers a satisfactory level. Unfortunately, some requirements may be artificially imposed. That is, a program may actually run at a satisfactory performance level, as deemed by a user of a computer system, but the user may be prevented from installing and running the software because the manufacturer has artificially locked out selected computer systems. In a sense, the manufacturer of the software has forced obsolescence of the computer system, as in the case of Microsoft and the Windows operating system. This may require a user to unnecessarily upgrade or purchase a new computer system, satisfying the requirements, incurring unneeded frustration, effort, collateral programming, and expense to the user.

In accordance with the issues and problems described hereinbefore, what is needed is a software solution whereby an older processor may emulate a newer processor's extended features without incurring a significant performance penalty, thereby eliminating the need to unnecessarily upgrade to a newer processor or computer system to host newer operating systems and software.

What is further needed is a software solution to make an older processor indistinguishable from a newer processor or a CPU upgrade to substantially all software accessed thereby, providing the same features and functionality.

What is further needed is a method to effectively seamlessly integrate, "weld", such a software solution into the operation of an older processor, in order to mediate and monitor all access and use of the processor to replicate an upgraded or later model processor's behavior.

BRIEF SUMMARY AND OBJECTS OF THE INVENTION

In view of the foregoing, it is desirable to provide a CPU life-extension module that may render a previous CPU indistinguishable from an upgraded CPU to virtually or substantially all operating systems and applications running thereon. Not only may the CPU "appear" to be an upgraded CPU to all software, but the CPU life-extension module may provide the same substantive features and functionality of an upgraded CPU. Thus, the useful life of a CPU may be extended and needless effort and expense may be avoided by the owners and users thereof. In addition, artificial locks and barriers, designed to prevent users from installing and using selected software, may be bypassed.

While some software may utilize newer instructions intended for an upgraded CPU, in many cases, the use of these new instructions may be relatively rare. In some cases, new instructions may only be used to identify and reject "old" processors during installation, and never occur again. In other cases, software may be artificially prevented from running on a particular processor simply due to the lack of a "new" instruction despite the fact that it is not using any of the "new" instructions. In many cases, software, utilizing new instructions may run quite satisfactorily on an older processor if the relatively few newer instructions could be translated into the older processor's native instruction set. Since the new instructions occur relatively infrequently, this translation process may result in very little performance degradation.

Consistent with the foregoing needs, and in accordance with the invention as embodied and broadly described herein, a method and apparatus are disclosed in one embodiment in accordance with the invention as including a processor configured to process data structures comprising executable and operational data. The processor may have a native instruction set that software may use to perform various tasks. A memory device may be operably connected to the processor to store the data structures.

In accordance with the invention, the data structures may include a CPU life-extension module configured to run on the processor and implement new instructions contained in an upgraded CPU's instruction set. The CPU life-extension module may augment the native instruction set of the processor to include additional instructions not previously recognized by the processor.

The CPU life-extension module may be further configured to intervene, when needed, between the processor and data structures processed by the processor, such as applications and the operating system, in order to "appear" to software as an upgraded CPU and to provide the same features and functionality of the upgraded CPU. In certain embodiments, the user may actually be able to choose the extensions to be applied to the CPU. In order to intervene between the processor and the operating system, in certain embodiments, the CPU life-extension module may be installed as a driver. This may allow the CPU life-extension module access to the processor at the highest privilege level.

The processor may be programmed to generate interrupts in response to system faults. The CPU life-extension module may be configured to perform its tasks in response to these interrupts. For example, the CPU life-extension module may be programmed to translate additional instructions, not recognized by the processor, into the processor's native instruction set for processing. This may be accomplished either statically when an application is being loaded or dynamically during execution by responding to an interrupt, generated by the processor, whenever an invalid operation code is encountered. An invalid operation code handler may be invoked that may translate the unrecognized operation code into operation codes recognized by the processor. If the operation code is not recognized by the CPU life-extension module, then the normal invalid operation code procedures may be invoked.

An apparatus and method in accordance with the invention may be programmed to modify system flags to emulate those of an upgraded CPU. For example, a processor may include a flags register containing flags to reflect system status. These flags may indicate whether or not a processor includes various features and functions. The CPU life-extension module may be programmed to detect READ instructions from and WRITE instructions to the flags register and modify the reads and writes to reflect an "extended" flag status corresponding to a CPU in an upgraded state. In certain embodiments, this may be accomplished by maintaining a virtual flags register within the CPU life-extension module.

An apparatus and method in accordance with the invention may configure the processor to generate a stack-fault interrupt whenever the processor pushes data onto the processor's stack. This may be accomplished, in part, by setting the stack size value equal to the address of the current top of the stack. Thus, a stack-fault handler may then be invoked whenever a value is pushed onto the stack. The stack-fault handler may then determine if the operation is pushing values of a flags register onto the stack, and if so, increment the stack size to allow the flags register to be pushed onto the stack, push the flags register onto the stack, and then modify the flag values to emulate those of an upgraded CPU. Thus, in certain embodiments, the modification of the flags register may occur in the copy thereof contained on the stack.

In a similar manner, the stack-fault handler module may be configured to detect future pop operations (e.g. operations pulling values off of the stack), corresponding to push operations (e.g. operations placing values onto the stack), and set breakpoint interrupts to occur in response to the pop operations. A breakpoint handler may then be invoked to decrease the stack size whenever a pop operation occurs. Thus, future push operations will continue to incur a stack-fault interrupt whenever executed. In other embodiments, the stack size may be maintained using approaches such as stack "shadowing", which may maintain a zero-size stack by always invoking a fault handler.

The data structures, in accordance with the present invention, may include an interrupt vector table, having address pointers, used to locate interrupt service routines and fault handlers. The CPU life-extension module may be configured to modify selected address pointers to point to the interrupt handlers and fault handlers used to implement an apparatus and method in accordance with the invention. These may include an invalid operation code handler, stack-fault handler, breakpoint handler, or combinations thereof as needed.

BRIEF DESCRIPTION OF THE DRAWINGS

The foregoing and other objects and features of the present invention will become more fully apparent from the following description and appended claims, taken in conjunction with the accompanying drawings. Understanding that these drawings depict only typical embodiments of systems in accordance with the invention and are, therefore, not to be considered limiting of its scope, the invention will be described with additional specificity and detail through use of the accompanying drawings in which:

FIG. 4 is a schematic block diagram illustrating a CPU life-extension module residing in the memory of a computer system;

DETAILED DESCRIPTION OF THE PREFERRED EMBODIMENTS

It will be readily understood that the components of the present invention, as generally described and illustrated in the Figures herein, may be arranged and designed in a wide variety of different configurations. Thus, the following more detailed description of the embodiments of systems and methods in accordance with the present invention, as represented in FIGS. 1 through 11, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

Figure 1:
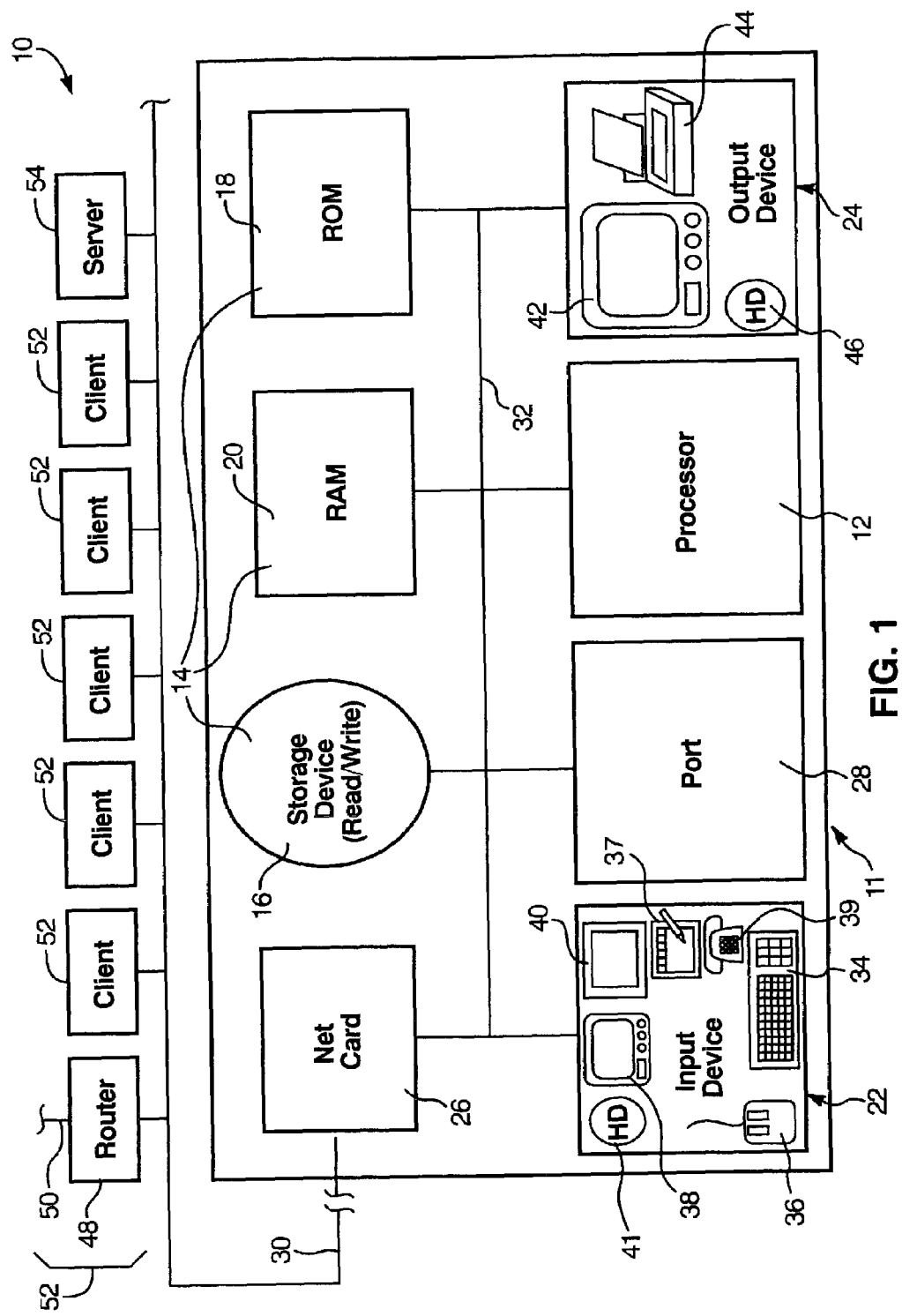
FIG. 1 is a schematic block diagram of a computer system in accordance with the invention.

Referring to FIG. 1, an apparatus 10 may implement the invention on one or more nodes 11, (client 11, computer 11) containing a processor 12 (CPU 12). All components may exist in a single node 11 or may exist in multiple nodes 11, 52 remote from one another. The CPU 12 may be operably connected to a memory device 14. A memory device 14 may include one or more devices such as a hard drive or other non-volatile storage device 16, a read-only memory 18 (ROM 18) and a random access (and usually volatile) memory 20 (RAM 20 or operational memory 20).

The apparatus 10 may include an input device 22 for receiving inputs from a user or from another device. Similarly, an output device 24 may be provided within the node 1, or accessible within the apparatus 10. A network card 26 (interface card) or port 28 may be provided for connecting to outside devices, such as the network 30.

Internally, a bus 32, or plurality of buses 32, may operably interconnect the processor 12, memory devices 14, input devices 22, output devices 24, network card 26 and port 28. The bus 32 may be thought of as a data carrier. As such, the bus 32 may be embodied in numerous configurations. Wire, fiber optic line, wireless electromagnetic communications by visible light, infrared, and radio frequencies may likewise be implemented as appropriate for the bus 32 and the network 30.

Input devices 22 may include one or more physical embodiments. For example, a keyboard 34 may be used for interaction with the user, as may a mouse 36 or stylus pad 37. A touch screen 38, a telephone 39, or simply a telecommunications line 39, may be used for communication with other devices, with a user, or the like. Similarly, a scanner 40 may be used to receive graphical inputs, which may or may not be translated to other formats. The hard drive 41 or other memory device 41 may be used as an input device whether resident within the node 11 or some other node 52 (e.g. 52, 54, etc.) on the network 30, or from another network 50.

Output devices 24 may likewise include one or more physical hardware units. For example, in general, the port 28 may be used to accept inputs into and send outputs from the node 11. Nevertheless, a monitor 42 may provide outputs to a user for feedback during a process, or for assisting two-way communication between the processor 12 and a user. A printer 44, a hard drive 46, or other device may be used for outputting information as output devices 24.

In general, a network 30 to which a node 11 connects may, in turn, be connected through a router 48 to another network 50. In general, two nodes 11, 52 may be on a network 30, adjoining networks 30, 50, or may be separated by multiple routers 48 and multiple networks 50 as individual nodes 11, 52 on an internetwork. The individual nodes 52 (e.g. 11, 48, 52, 54) may have various communication capabilities.

In certain embodiments, a minimum of logical capability may be available in any node 52. Note that any of the individual nodes 11, 48, 52, 54 may be referred to, as may all together, as a node 11 or a node 52. Each may contain a processor 12 with more or less of the other components 14–46.

A network 30 may include one or more servers 54. Servers may be used to manage, store, communicate, transfer, access, update, and the like, any practical number of files, databases, or the like for other nodes 52 on a network 30. Typically, a server 54 may be accessed by all nodes 11, 52 on a network 30. Nevertheless, other special functions, including communications, applications, directory services, and the like, may be implemented by an individual server 54 or multiple servers 54.

In general, a node 11 may need to communicate over a network 30 with a server 54, a router 48, or nodes 52. Similarly, a node 11 may need to communicate over another network (50) in an internetwork connection with some remote node 52. Likewise, individual components 12–46 may need to communicate data with one another. A communication link may exist, in general, between any pair of devices.

Figure 2:
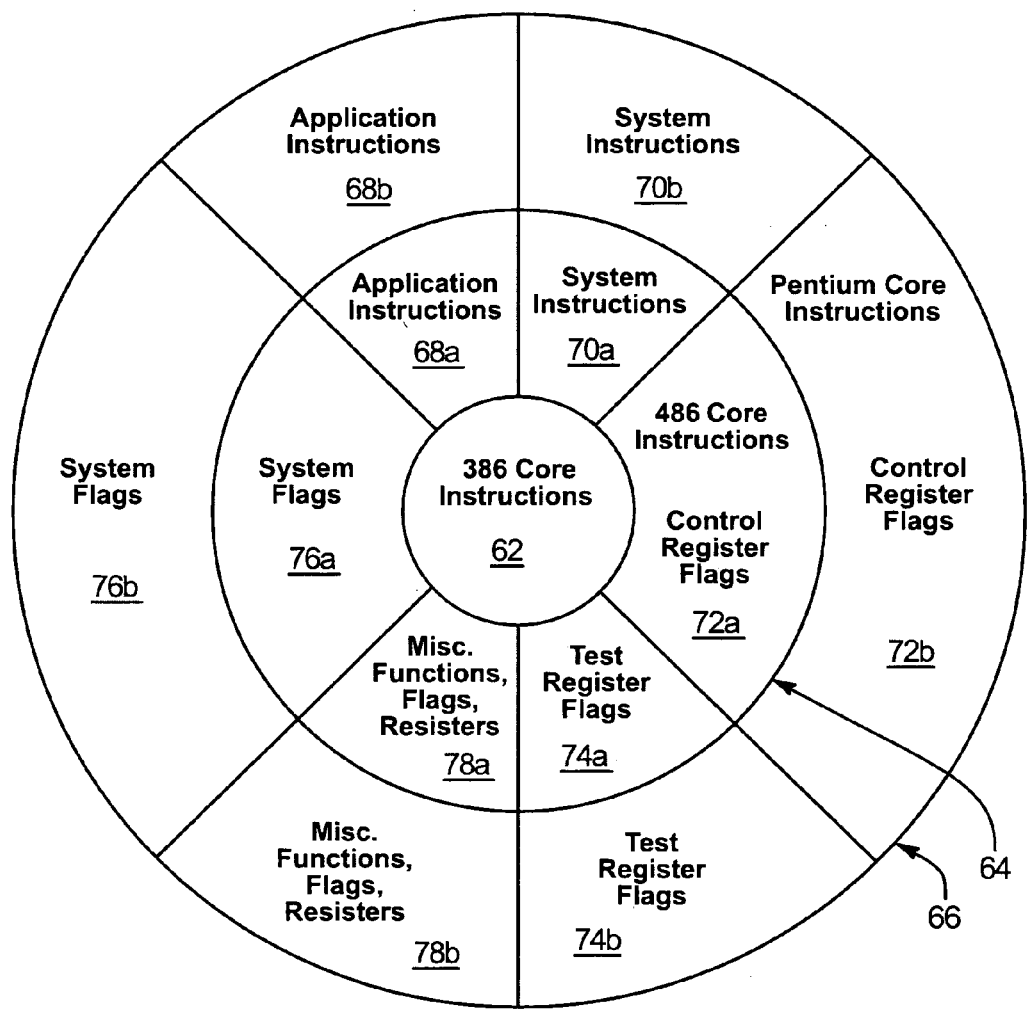
FIG. 2 is a schematic block diagram illustrating a core instruction set of a CPU and examples of additional instructions that may be added as a CPU is upgraded.

Referring to FIG. 2, a CPU 12 may include a core instruction set 62, or native instruction set 62. The instruction set 62 may include all of the instructions or commands that a CPU architecture may recognize and follow. Programs running on the CPU 12 may be required to perform their various tasks using the instruction set 62 of the CPU 12 on which they are running. In this example, an Intel 386 instruction set 62 is illustrated as the core instruction set 62, because the 386 is a 32-bit architecture and addition of new instructions by the 486 and Pentium may be easily illustrated. However, the principles illustrated herein may be applied to any core instruction set 62, such as that used by the Intel 286 or 8086 architectures.

Subsequently upgraded CPU architectures may have instruction sets 64, 66 containing all of the instructions 62 of a preceding CPU architecture in addition to new instructions 68a, 70a, 72a, 74a, 76a, 78a, and 68b, 70b, 72b, 74b, 76b, 78b, respectively. For example, the instruction set 64 of the Intel 486 architecture may provide instructions additional to those used by the 386 architecture 62. New instructions 64 may include application instructions 68a, system instructions 70a, control registers and control flags 72a, test registers and test flags 74a, system flags 76a, as well as other miscellaneous functions, flags, and registers 78a.

Application instructions 68a, in general, may include those instructions made available to applications running at any privilege level. System instructions 70a, in general, may refer to special instructions that may only be available to applications running in the most privileged mode, such as by the operating system.

Control registers and control flags 72a are generally registers and flags that provide system level functionality used to configure the CPU 12, such as may be required by an operating system. System flags 76a, in general, may provide system status and available system features and may be available to applications running at a lower privilege level, in addition to applications running at a high privilege level, such as an operating system.

Test registers and test flags 74b may also be made available to applications running at a high privilege level, such as an operating system or system diagnostics. Miscellaneous functions, flags, and registers 78a refer to any other function, flags, and registers that the system 10 may use in its operation.

Likewise, the Pentium CPU architecture 66 may provide additional instructions to the 486 and 386 architectures. The Pentium architecture 66 may include new application instructions 68b, system instructions 70b, control registers and control flags 72b, test registers and test flags 74b, system flags 76b, as well as other miscellaneous function, flags, and registers 78b.

In order for a previous architecture 62, such as a 386 architecture, to emulate a newer architecture 64, 66, such as that of a 486 or Pentium, the additional instructions 64, 66, need to be "welded" closely to the previous architecture 62. That is, a core instruction set 62, provided by a physical processor 12, must include the CPU life-extension module engaged to seamlessly operate therewith, "welded" very closely thereto, so that applications, operating systems, and the like, perceive the software-extended CPU 64, 66 as indistinguishable from the physically upgraded CPU 12.

The term "welded" is used in this description to describe a layer of software working very closely with a piece of physical hardware such that the software and hardware function as a virtually indistinguishable unit. The "welded" software is granted the highest level of privilege to access the hardware and is very difficult to bypass or separate from the subject hardware.

Figure 3:
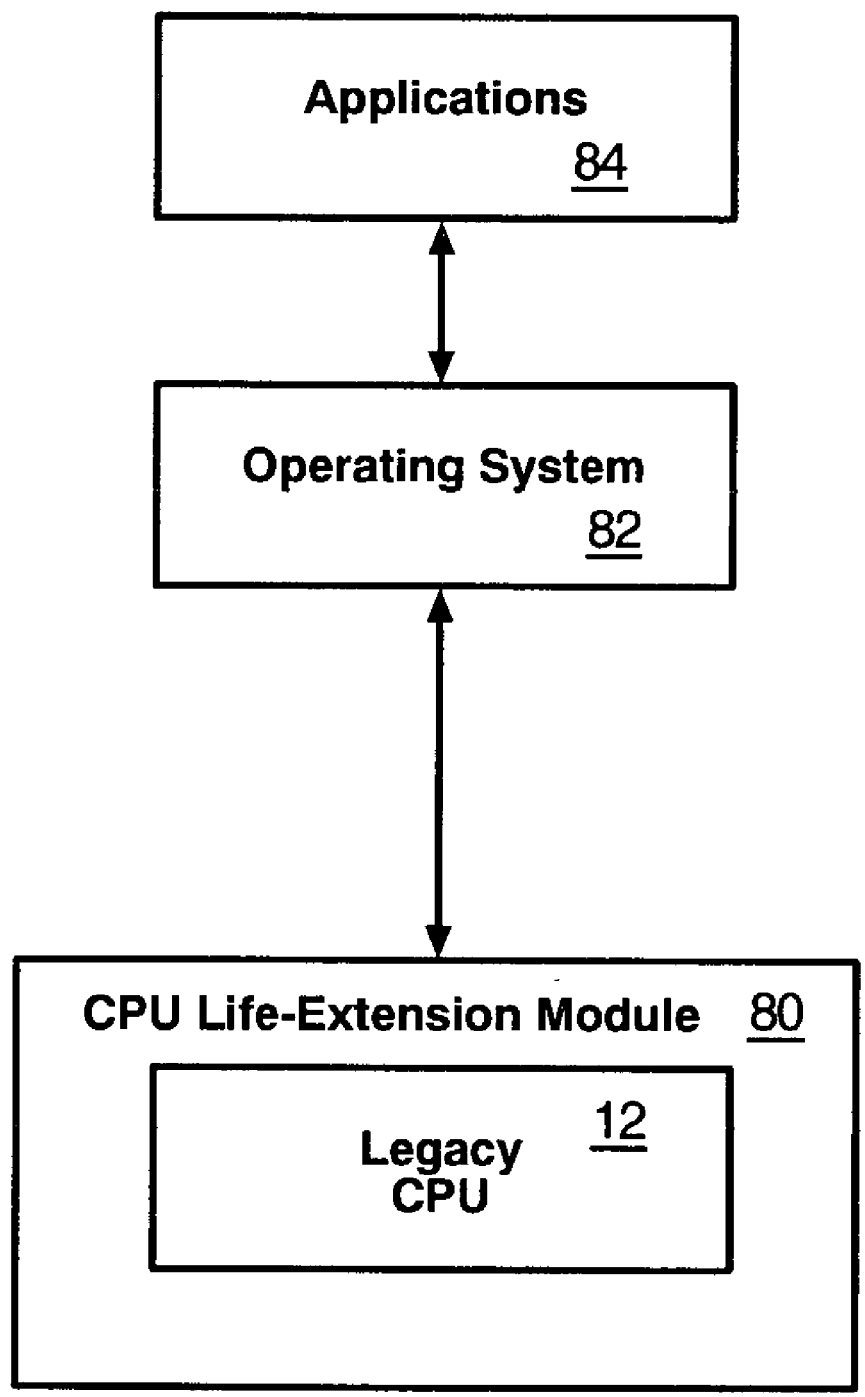
FIG. 3 is a schematic block diagram illustrating a CPU life-extension module mediating information exchanged between the processor, applications, and the CPU.

Referring to FIG. 3, a CPU life-extension module 80 may mediate all exchanges of data between the operating system 82, applications 84 and the physical CPU 12. Thus, the CPU life-extension module 80 may actually appear, in virtually all respects, to be an upgraded CPU 12, having an upgraded or enhanced instruction set 64, 66. Integrating or welding the CPU life-extension module 80 into the physical CPU 12 maybe necessary to prevent the operating system 82 or applications 84 from bypassing the life-extension module 80 and making calls directly to the CPU 12, thereby possibly incurring errors and impeding proper functioning of the computer system 10.

Since the operating system 82 may function at the highest level of privilege, obtaining a privilege level whereby the CPU life-extension module 80 may have control of all exchanges between the operating system 82, applications 84, and the physical CPU 12, may be difficult to achieve. Therefore, in certain embodiments, the CPU life-extension module 80 may be installed as a system driver. Embodying the CPU life-extension module 80 as a driver may allow the life-extension module 80 to be inserted between the operating system 82 and the CPU 12 and provide the necessary level of privileged access to the CPU 12.

Referring to FIG. 4, an apparatus and method in accordance with the invention may be stored in a system memory device 14. For example, system memory 14 may store an operating system 82 that may include various interrupt handlers 90 programmed to execute based on the occurrence of system interrupts. The memory 14 may also include an interrupt vector table 92 that may index the system interrupts to corresponding address pointers.

These address pointers may point to memory locations containing service routines, such as drivers 94, programmed to address particular interrupts. Drivers 94 may also be stored in memory 14 and may be configured to control I/O devices 22, 24, or other peripheral hardware connected to the computer system 10. In certain embodiments, a CPU life-extension module 80 may be installed as a driver 94 to achieve a privilege level equal to that of the operating system 82.

The CPU life-extension module 80 may include other modules 96, 98, 100, 102 to perform various tasks. The function of these modules will be described in further detail. For example, the CPU life-extension module 80 may include an invalid operation code handler module 96, a stack-fault handler module 98, a breakpoint handler module 100, as well as other modules 102.

The invalid operation code handler module 96 may be configured to execute in response to operation codes that are not recognized by the CPU 12. The invalid operation code handler 96 may be programmed to dynamically translate new instructions, intended for an upgraded CPU 64, 66, into terms of the instructions of the core instruction set 62. A stack-fault handler module 98 may execute upon occurrence of system stack faults, including overflows and illegal accesses to the stack. A breakpoint handler module 100 may be executed upon occurrence of breakpoints in program code, executed by the processor 12. Likewise, the CPU life-extension module 80 may include other handler modules 102 as needed. In addition, memory 14 may store applications 84 written to run on the CPU 12 or on an upgraded CPU 64, 66. These applications 84 may or may not use new instructions not recognized by the CPU 12, having core instruction set 62.

Figure 5:
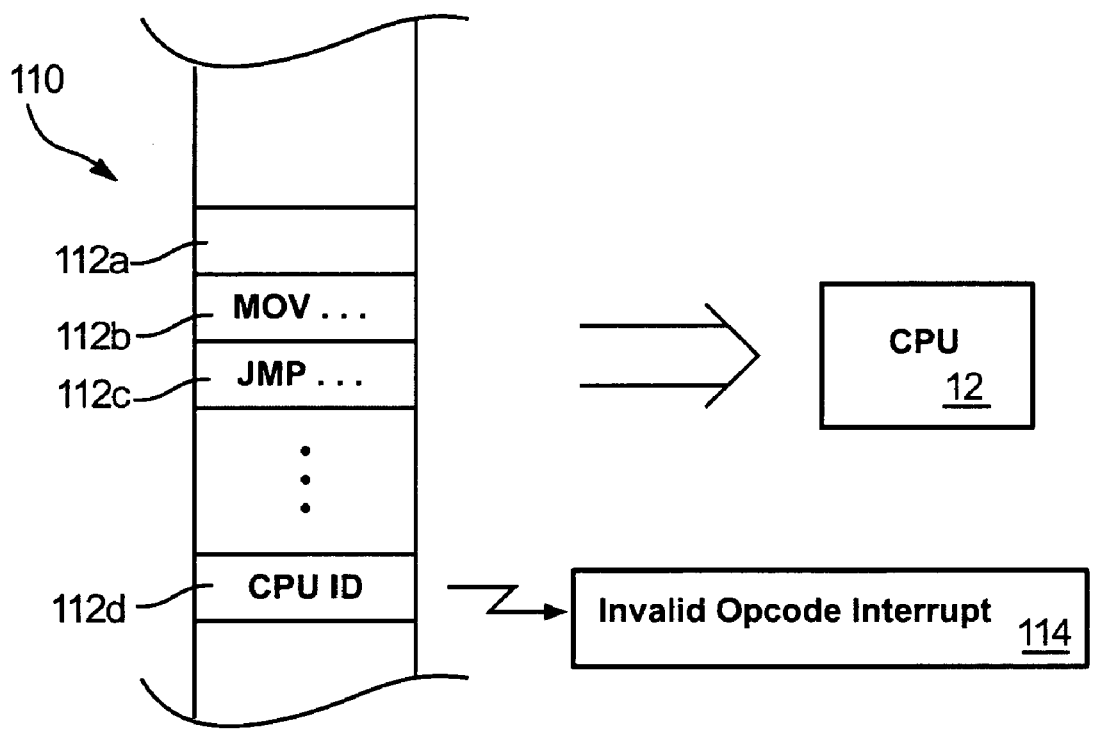
FIG. 5 is a schematic block diagram illustrating program code being processed by a CPU in accordance with the invention.

Referring to FIG. 5, a CPU 12 may be configured to process program code 110 that may include a series of instructions 112a, 112b, 112c, 112d. Some instructions 112b, 112c may be recognized and processed correctly by a CPU 12. Newer instructions 112d, intended for an upgraded CPU 64, 66, may not be recognized by the CPU 12 and may generate an invalid operation code interrupt 114 or fault 114 in response to such occurrences.

This may in turn trigger the execution of an interrupt service routine 96 or fault handler 96 programmed to handle invalid operation codes 112d. In accordance with the invention, the invalid operation code handler 96 may be programmed such that new instructions, intended for a CPU upgrade 64, 66 may be translated into operation codes recognized by an older CPU 12. This process will be described in more detail with respect to the description of FIG. 8.

Figure 6:
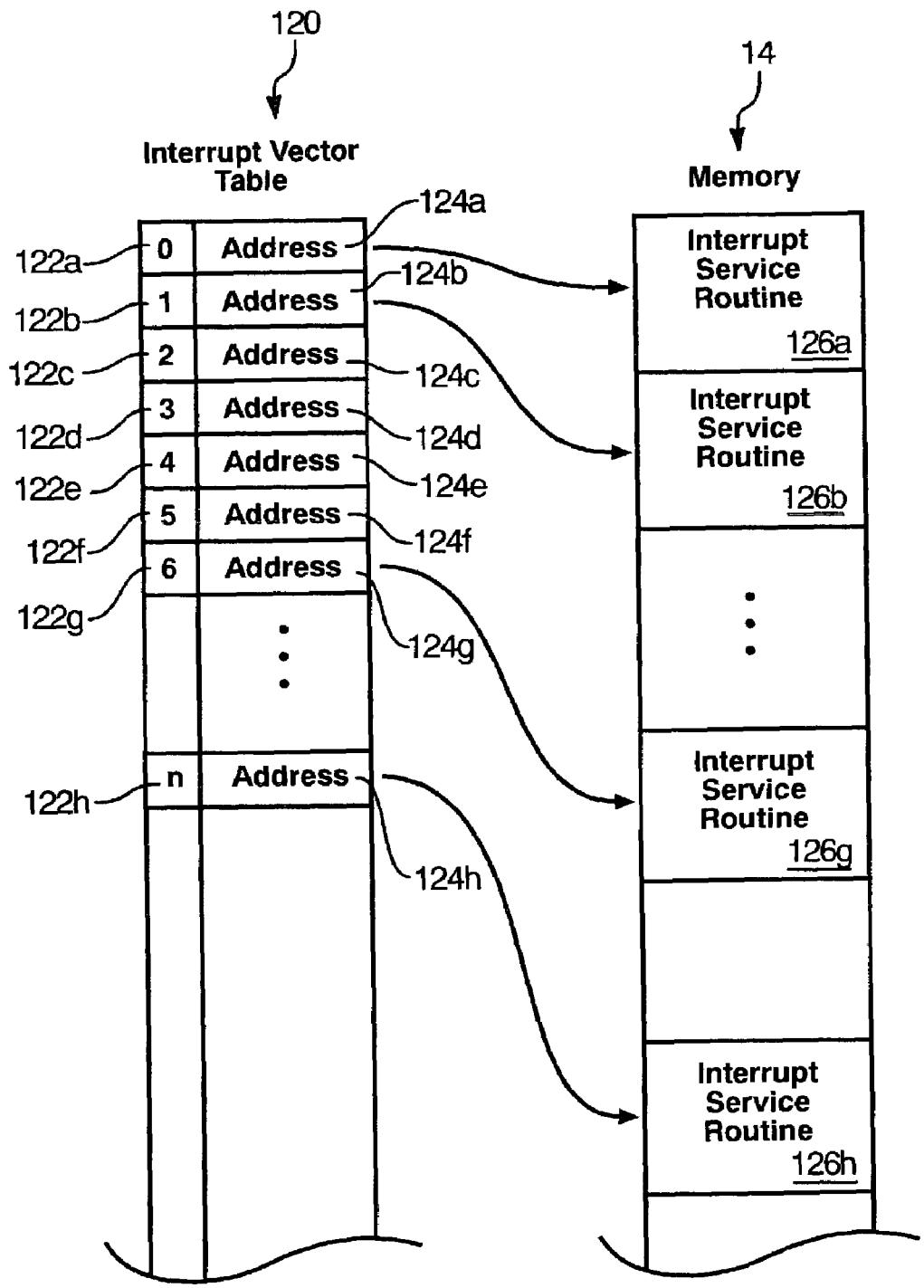
FIG. 6 is a schematic block diagram of a real-mode interrupt vector table used to process system interrupts and interrupt service routines located in computer system memory.

Referring to FIG. 6, contents of a memory device 14 may include a real-mode interrupt vector table 120 used to index various system interrupts 122a–h to corresponding address pointers 124a–h. The address pointers 124a–h may point to locations in memory 14 containing various interrupt service routines 126a–h or fault handlers 126a–h. These interrupt service routines 126a–h may address various interrupts 122a–h, such as invalid operation codes, stack faults, breakpoints, and the like. The address pointers 124a–h may be modified to point to the various modules in accordance with the invention, such as the invalid operation code handler module 96, the stack-fault handler module 98, and the breakpoint handler module 100. Thus, the interrupt service routines 126a–h may be modified or reprogrammed to achieve the objects of the present invention. The use of real-mode examples is not limiting to the scope of the invention, but only used to simplify the description of one example whereby the invention may be implemented.

For example, an invalid operation code may trigger an interrupt 122g, that in turn may trigger operation of an interrupt service routine 126g, programmed to address invalid operation codes. Normally, If the operation code is not recognized by the CPU 12, then a corrective event, such as a system shutdown, may occur. However, the interrupt service routine 126g may be reprogrammed or modified, in accordance with the present invention, to determine if the operation code is a new instruction intended for an upgraded CPU 64, 66, and translate the instruction into instructions recognized by the CPU 12.

For example, if a CPUID instruction is encountered, the interrupt service routine 126g may be programmed to return the characteristics of an upgraded CPU, as selected by a user. Thus, the interrupt service routine 126g may be reprogrammed to handle new instructions. Likewise, other interrupt service routines 126a–g may also be reprogrammed to perform various tasks in accordance with the present invention.

Figure 7:
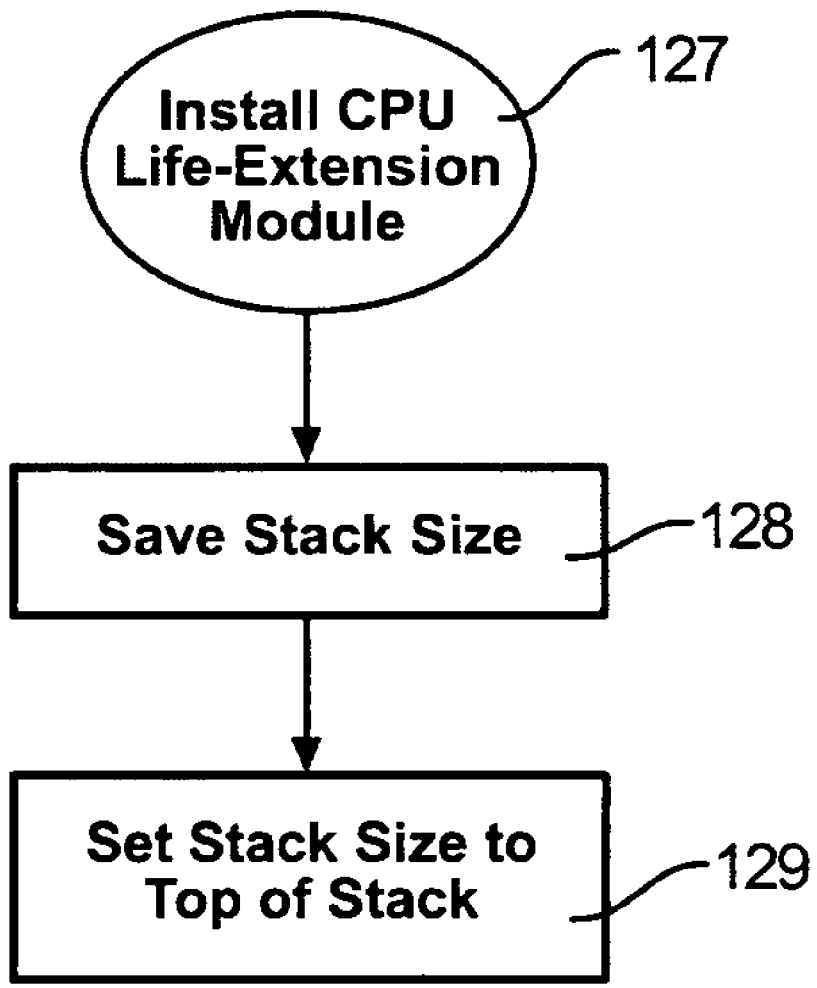
FIG. 7 is a schematic block diagram illustrating various steps executed during an initial installation of one embodiment of a CPU life-extension module.

Referring to FIG. 7, in one embodiment, the CPU life-extension module 80 may begin 127 by saving 128 the current stack size and setting 129 the value of the current stack size equal to the value of the address of the top of the stack. Thus, any values pushed onto the stack will create an overflow condition, thereby generating a stack fault. The stack fault may trigger the execution of the stack-fault handler module 98, that will be described in more detail as part of the description of FIG. 10.

By setting the stack size to correspond to the top of the stack, any values pushed onto or popped from the stack may be monitored, thereby turning over control to the CPU life-extension module 80. This operation may be particularly important when the flags register is pushed onto the stack. The CPU life-extension module 80 may then manipulate various flag status values in order to emulate flag status values 76a of an upgraded CPU 64, 66.

Figure 8:
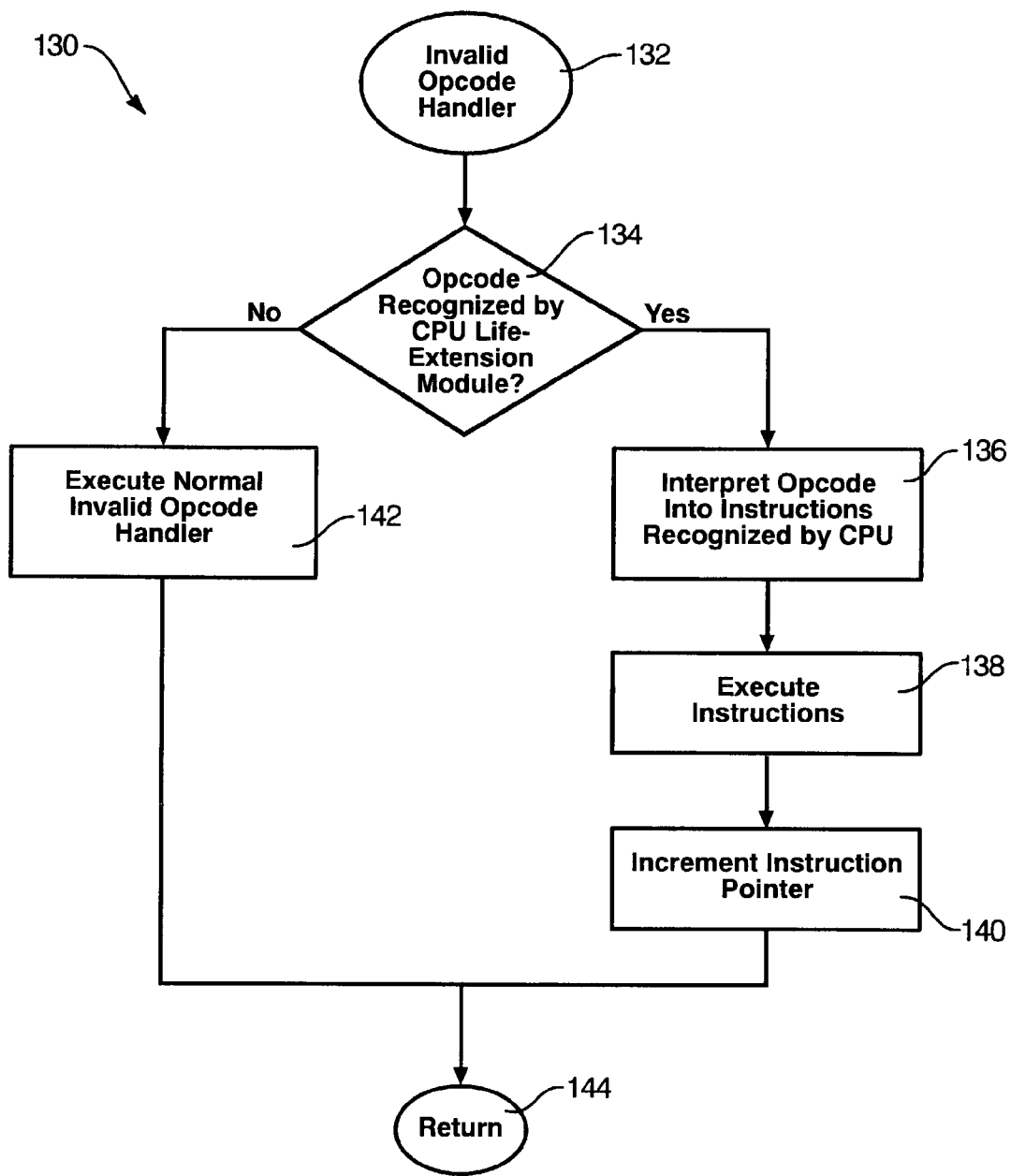
FIG. 8 is a schematic block diagram of a real-mode invalid operation code interrupt service routine in accordance with the invention.

Referring to FIG. 8, an invalid operation code handler 130 may begin 132 by executing a test 134 to determine if the operation code is recognized by the CPU life-extension module 80. If the operation code is recognized by the CPU life-extension module 80, the operation code may be dynamically translated 136 into instructions recognized by the CPU 12. These instructions may then be executed 138 by the CPU 12. Since the invalid operation code may be dynamically translated and executed within the invalid operation code handler 130, the instruction pointer of the CPU 12 may then be incremented 140 in order to proceed to the next instruction. Operation may then be returned 144 to the interrupted program.

If the operation code is not recognized by the CPU life-extension module 80 at the test 134, the original invalid operation code handler may then be executed 142, invoking a system shutdown, message, or the like. Thus, new instructions intended for an upgraded CPU 64, 66 may be dynamically translated into instructions recognized by an older CPU 12.

Figure 9:
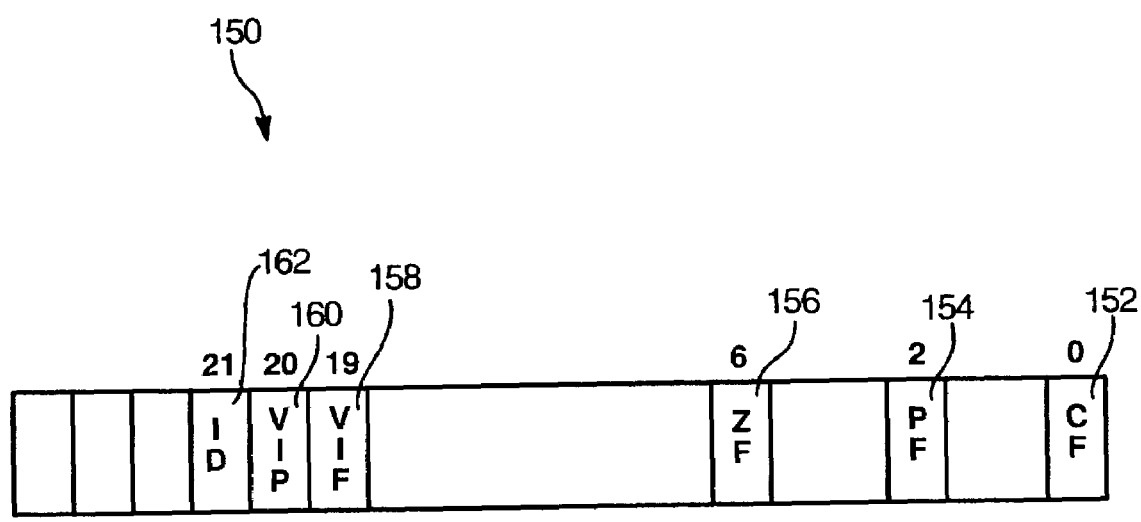
FIG. 9 is a schematic block diagram of a flags register containing the status of various system flags in an upgraded CPU.
Figure 10:
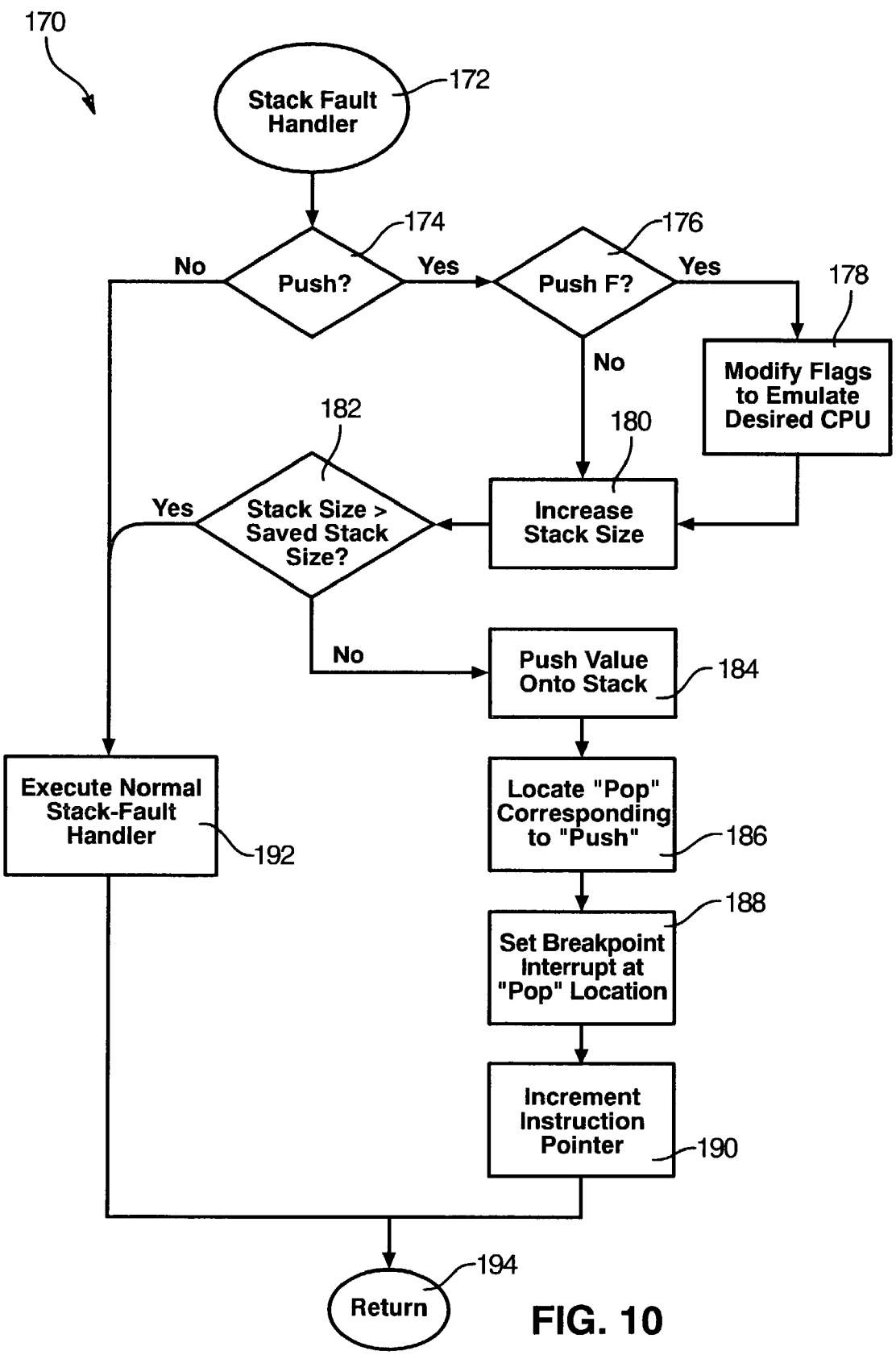
FIG. 10 is a schematic block diagram of one embodiment of a modified real-mode stack-fault interrupt service routine used in accordance with the invention.

Referring to FIG. 9, new instructions may include application instructions 68a, system instructions 70a, control registers and flags 72a, test registers and flags 74a, system flags 76a, and other miscellaneous functions, flags, and registers 78a. The occurrence of new instructions, whether they be application instructions 78a or system instructions 70a, may be handled by the invalid operation code handler module 96 upon occurrence of an invalid operation code fault 114. Thus, the new instructions may be dynamically translated 136 into instructions recognized by the CPU 12.

Modifying the system flag 76a to emulate an upgraded CPU 64, 66 may be much more difficult to implement because the mere reading or writing of a value to a flags register 150 may not generate an error and corresponding interrupt 122. Thus, apparatus and methods are needed to detect READ and WRITE instructions to and from the flags register 150 in order to make modifications to the status contained therein to emulate an upgraded CPU 64, 66.

The flags register 150 may include bits indicating various system status. For example, the flags register 150 may include a carry flag 152 to indicate a carry condition when performing addition, a parity flag 154 to detect data integrity, and a zero flag 156 that may be set when an arithmetic operation results in zero. In addition, other flags may be included to indicate whether a selected CPU 12 includes various features or functions.

For example, an ID flag 162 may be used to determine if the processor 12 supports the CPUID instruction. Similarly, a VIP flag 160 and a VIF flag 158 may be provided to indicate various status in upgraded CPUs 64, 66. Thus, apparatus and methods are needed to detect READs from and WRITEs to the flag register 150 in order to manipulate the flag values to represent an upgraded CPU 64, 66.

In certain embodiments, this may be accomplished by modifying the handler that responds to stack faults. For example, referring to FIG. 10, a stack-fault handler 170 may be configured to execute whenever a value is pushed onto the stack. As described with respect to FIG. 7, by setting the stack size to the current top of stack, any value pushed onto the stack may generate a stack-fault. Therefore, the "push" command may then be examined to determine if the flag register 150 is to be pushed onto the stack.

For example, a stack-fault handler 170 may begin 172 by executing a first test 174 to determine if the stack-fault was caused by a value being pushed onto the stack. If so, a second test 176 may be executed to determine if the push operation was an attempt to push the flags register 150 onto the stack (pushf command). If it is determined by the test 176 that the fault was caused by an attempt to push the flags register 150 onto the stack, the flag status may then be modified 178 to emulate a desired upgraded CPU 64, 66. This may involve modifying one or several bits of the flag status values to emulate an upgraded CPU 64, 66. Once the flag status values are modified to emulate the desired CPU upgrade 64, 66, the stack size may be incremented 180. However, if at the test 176, the "push" operation is determined not to attempt to push the flags register 150 onto the stack, then the flags modification step 178 may be skipped and the stack size may be incremented 180.

After the stack size has been incremented 180, a test 182 may be performed, comparing the current stack size to the saved stack size, saved in step 128, and discussed in the description of FIG. 7. If the stack size is greater than the saved stack size 128, then the stack-fault handler 170 may execute normal stack-fault handling procedures 192 originally corresponding to the operating system 82. However, if in the test 182, the stack size is determined to be less than the saved stack size 128, then the process 170 may continue by actually pushing 184 the subject value onto the stack.

Once the value has been pushed 184 onto the stack, the stack-fault handler 170 may then locate 186, in the program code, the pop operation corresponding to the push operation executed in step 184. The stack-fault handler 170 may then set 188 a breakpoint interrupt to occur in the program code at the location of the pop operation.

One reason for setting 188 a breakpoint interrupt at the location of future pop operations is to allow execution of a breakpoint handler 200 in order to decrement 206 the stack size. Decrementing the stack size, after a pop operation, is important in order to assure that future push operations will incur stack faults. The breakpoint handler 200 will be described in more detail as part of the description of FIG. 11. After the breakpoint interrupt is set 188, the instruction pointer of the CPU 12 may then be incremented 190 to point to the next instruction in the program code. Control may then be returned 194 to the interrupted program.

Figure 11:
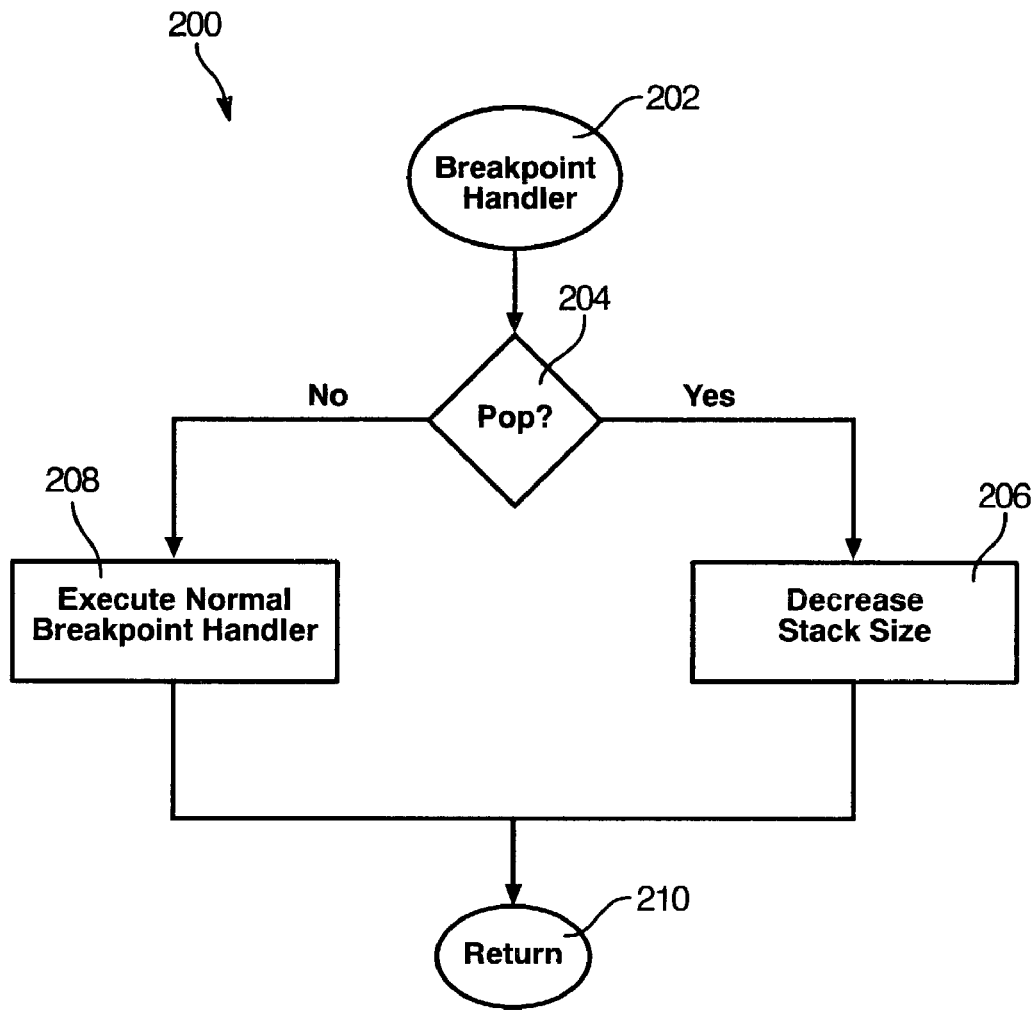
FIG. 11 is a schematic block diagram of one embodiment of a modified real-mode breakpoint interrupt service routine operable in accordance with the invention.

Referring to FIG. 11, a breakpoint handler 200 may begin 202 by performing a test 204 to determine if the breakpoint corresponds to a pop operation. If the breakpoint does correspond to a pop operation, the stack size may then be decremented 206. However, if at the test 204 the breakpoint is determined not to correspond to a pop operation, then the breakpoint handler 200 may execute 208 normal breakpoint handling procedures that may have originally been processed by the operating system 82. Control may then be returned 210 to the CPU 12.

From the above discussion, it will be appreciated that the present invention provides a CPU life-extension module that may effectively render a processor operable to emulate a newer CPU. As has been previously described, an apparatus and method in accordance with the invention may statically or dynamically translate newer instructions, intended for an upgraded CPU, into instructions recognized by the processor, effectively augmenting the processor's instruction set and providing all the functionality of an upgraded CPU. In addition, system flags may be modified to emulate those of an upgraded CPU. As a result, the effective life of a CPU may be extended, thereby reducing expense and lost-time incurred by needing to upgrade a processor.

In certain embodiments, the user may be provided the ability to choose the characteristics of the processor designed to be emulated. Likewise, the user may choose to execute the invention in any of the modes (real, protected, V86, etc.) of the processor. Thus, the processor may emulate a selected upgraded processor by providing the same level of functionality, features, and may be substantially indistinguishable to all software of certain selected types, or even all applicable software accessed thereby, including the operating system.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description. All changes within the meaning and range of equivalency of the claims are to be embraced within their scope.

What is claimed is:

1. An apparatus for extending the functionality of a processor to that of an upgraded CPU, having an upgraded native instruction set, including at least one new native instruction, the apparatus comprising:
   the processor configured to process data structures comprising executable and operational data, the processor having an old native instruction set corresponding thereto, included as a subset of the upgraded native instruction set, and not including the at least one new native instruction; and
   a memory device operably connected to the processor and configured to store the data structures, the data structures further comprising:
   a CPU extension module configured to enable the processor to process, rather than reject, the at least one new native instruction, and
   the CPU extension module further configured to intervene upon detection of the at least one new native instruction, to selectively provide alternative instructions in terms of the old native instruction set, to render the processor indistinguishable from the upgraded CPU to software processed thereby, and
   a stack wherein the processor is configured to push data onto the stack, generate a stack-fault interrupt whenever data is pushed onto the stack, and invoke execution of a stack-fault handler in response to the stack-fault interrupt.

2. The apparatus of claim 1, wherein:
   the data structures further comprise an operating system corresponding to the upgraded native instruction set; and
   the CPU extension module is further configured to render the processor indistinguishable, to the operating system, from the upgraded CPU.

3. The apparatus of claim 1, wherein the CPU extension module further comprises a translation module configured to translate the at least one new native instruction into a translated instruction represented entirely in terms of the old native instruction set.

4. The apparatus of claim 3, wherein the processor is configured to generate interrupts in response to system faults and the CPU extension module is configured to selectively respond to the interrupts.

5. The apparatus of claim 4, wherein:
   the processor further comprises a flags register containing flags, each configured to reflect a value corresponding to a status;
   the CPU extension module is further configured to detect READs from and WRITEs to the flags register; and
   the CPU extension module is further configured to modify the READs and WRITEs to reflect a value corresponding to the upgraded CPU.

6. The apparatus of claim 5, wherein the processor is configured to generate a first interrupt in response to an invalid operation code and to invoke execution of an invalid operation code handler.

7. The apparatus of claim 6, wherein:
   the data structures further comprise a stack; and
   the processor is configured to push data onto the stack, and invoke the invalid operation code handler in response to selected stack instructions that have been translated at load time to generate an invalid operation fault.

8. The apparatus of claim 6, wherein the stack-fault handler is configured to detect a pop operation due to be executed in the future, and set a breakpoint interrupt to occur in response to the pop operation.

9. The apparatus of claim 8, further comprising a breakpoint handler configured to decrement the stack size, in response to the breakpoint interrupt.

10. The apparatus of claim 6, wherein the stack-fault handler is further configured to detect pushing of the contents of the flags register onto the stack.

11. The apparatus of claim 10, wherein the data structures further comprise an interrupt vector table, having address pointers, and wherein the CPU extension module is configured to modify at least one address pointer to point to a memory location containing at least one of the invalid operation code handler, the stack-fault handler, and the breakpoint handler.

12. The apparatus of claim 1, wherein the processor is configured to generate interrupts in response to system faults and the CPU extension module is configured to selectively respond to the interrupts.

13. The apparatus of claim 1, wherein:
   the processor further comprises a flags register containing flags, each configured to reflect a value corresponding to a status;
   the CPU extension module is further configured to detect READs from and WRITEs to the flags register; and
   the CPU extension module is further configured to modify the READs and WRITEs to reflect a value corresponding to the upgraded CPU.

14. The apparatus of claim 1, wherein the processor is configured to generate a first interrupt in response to an invalid operation code and to invoke execution of an invalid operation code handler.

15. The apparatus of claim 14, wherein the invalid operation code has been selectively inserted into a currently executing instruction stream at load time.

16. The apparatus of claim 1, wherein:
the processor is configured to execute a stack-fault handler in response to a stack fault; and
the stack-fault handler is configured to detect a pop operation due to be executed in the future and set a breakpoint interrupt to occur in response to the pop operation.

17. The apparatus of claim 1, wherein the processor is configured to execute a breakpoint handler, in response to a breakpoint interrupt, to decrement the stack size.

18. The apparatus of claim 1, wherein the processor is configured to execute a stack-fault handler in response to a stack fault; and
the stack-fault handler is configured to detect pushing of the contents of the flags register onto the stack.

19. The apparatus of claim 1, wherein the data structures further comprise an interrupt vector table, having address pointers, and wherein the CPU extension module is configured to modify at least one address pointer.

20. A method for extending the functionality of a processor to that of an upgraded CPU, having an upgraded native instruction set, including at least one new native instruction, the method comprising:
providing the processor configured to process data structures comprising executable and operational data, the processor having an old native instruction set corresponding thereto, included as a subset of the upgraded native instruction set, and not including the at least one new native instruction;
enabling the processor to process, rather than reject, the at least one new native instruction;
intervening, upon detection of the at least one new native instruction, to selectively provide alternative instructions in terms of the old native instruction set to render the processor indistinguishable from the upgraded CPU to software processed thereby; and
pushing data onto a stack, generating a stack-fault interrupt whenever data is pushed onto the stack, and invoking execution of a stack-fault handler in response to the stack-fault interrupt.

21. The method of claim 20, further comprising rendering the processor indistinguishable, to an operating systems from the upgraded CPU.

22. The method of claim 20, further comprising translating the at least one new native instruction into a translated instruction represented entirely in terms of the old native instruction set.

23. The method of claim 22, wherein the processor is configured to generate interrupts in response to system faults, and wherein intervening further comprises selectively responding to the interrupts.

24. The method of claim 23, wherein the processor further comprises a flags register containing flags, each configured to reflect a value corresponding to a status; and
further comprising detecting READs from and WRITEs to the flags register and modifying the READs and WRITEs to reflect a value corresponding to the upgraded CPU.

25. The method of claim 24, wherein the processor is configured to generate a first interrupt in response to an invalid operation code and to invoke execution of an invalid operation code handler.

26. The method of claim 25, wherein the stack-fault handler is configured to detect a pop operation due to be executed in the fixture, and set a breakpoint interrupt to occur in response to the pop operation.

27. The method of claim 26, further comprising decrementing the stack size in response to the breakpoint interrupt.

28. The method of claim 25, wherein the stack-fault handler is further configured to detect pushing of the contents of the flags register onto the stack.

29. The method of claim 28, further comprising providing an interrupt vector table, having address pointers, and wherein the CPU extension module is configured to modify at least one address pointer to point to a memory location containing at least one of the invalid operation code handler, the stack-fault handler, and the breakpoint handler.

30. The method of claim 20, wherein the processor is programmed to generate interrupts in response to system faults, and wherein intervening further comprises selectively responding to the interrupts.

31. The method of claim 20, wherein the processor further comprises a flags register containing flags, each configured to reflect a value corresponding to a status; and
further comprising detecting READs from and WRITEs to the flags register and modifying the READs and WRITEs to reflect a value corresponding to the upgraded CPU.

32. The method of claim 20, wherein the processor is configured to generate a first interrupt in response to an invalid operation code and to invoke execution of an invalid operation code handler.

33. The method of claim 32, wherein the invalid operation code has been selectively inserted into a currently executing instruction stream at load time.

34. The method of claim 20, further comprising detecting a pop operation due to be executed in to future, and setting a breakpoint interrupt to occur in response to the pop operation.

35. The method of claim 34, further comprising decrementing the stack size in response to the breakpoint interrupt.

36. The method of claim 20, further comprising detecting pushing of the contents of the flags register onto the stack.

37. The method of claim 20, further comprising providing an interrupt vector table, having address pointers, and modifying at least one address pointer.

38. An article including a computer readable medium for extending the functionality of a processor to that of an upgraded CPU, having an upgraded native instruction set, including at least one new native instruction, the article comprising:
a CPU extension module configured to enable the processor, having an old native instruction set corresponding thereto, included as a subset of the upgraded native instruction set, and not including the at least one new native instruction, to process, rather than reject, the at least one new native instruction;
the CPU extension module further configured to intervene upon detection of the at least one new native instruction, to selectively provide alternative instructions in terms of the old native instruction set to render the processor indistinguishable from the upgraded CPU to software processed thereby; and
a stack wherein the processor is configured to push data onto the stack, generate a stack-fault interrupt whenever data is pushed onto the stack, and invoke execution of a stack-fault handler in response to the stack-fault interrupt.

* * * * *

UNITED STATES PATENT AND TRADEMARK OFFICE
CERTIFICATE OF CORRECTION

PATENT NO. : 7,171,546 B2 Page 1 of 1
APPLICATION NO. : 10/155284
DATED : January 30, 2007
INVENTOR(S) : Phillip M. Adams It is certified that error appears in the above-identified patent and that said Letters Patent is hereby corrected as shown below:

On Title Page, item 54 and Col. 1 Line 1 please delete "CPU LIFE-EXTENSION APPARATUS AND METHOD", and insert therefor -- CPU FUNCTIONALITY-EXTENSION APPARATUS AND METHOD --.

Column 5, line 21, please delete "1", and insert therefore -- 11 --.

Column 11, line 49, please delete "and".

Column 13, line 66, please delete "fixture", and insert therefor -- future --.

Signed and Sealed this

Seventeenth Day of April, 2007

JON W. DUDAS
*Director of the United States Patent and Trademark Office*